United States Patent
Wright et al.

(10) Patent No.: US 7,158,919 B2
(45) Date of Patent: Jan. 2, 2007

(54) REMOTE MONITORING SYSTEM

(75) Inventors: Gary S Wright, Derby (GB); John P Shoesmith, Derby (GB)

(73) Assignee: Rolls-Royce plc, London (GB)

( * ) Notice: Subject to any disclaimer, the term of this patent is extended or adjusted under 35 U.S.C. 154(b) by 82 days.

(21) Appl. No.: 10/857,905

(22) Filed: Jun. 2, 2004

(65) Prior Publication Data

US 2006/0265193 A1    Nov. 23, 2006

(51) Int. Cl.
*G06F 19/00* (2006.01)

(52) U.S. Cl. .................. 702/188; 703/18; 376/245; 376/277; 340/635

(58) Field of Classification Search ...................... None
See application file for complete search history.

(56) References Cited

U.S. PATENT DOCUMENTS

| | | | |
|---|---|---|---|
| 4,203,160 A | | 5/1980 | Doherty |
| 5,005,142 A | * | 4/1991 | Lipchak et al. .............. 702/183 |
| 5,267,277 A | * | 11/1993 | Scarola et al. .............. 376/216 |
| 5,311,562 A | * | 5/1994 | Palusamy et al. ........... 376/215 |
| 5,317,606 A | * | 5/1994 | Kinoshita et al. ........... 376/217 |
| 5,433,245 A | * | 7/1995 | Prather et al. .............. 137/554 |
| 5,764,509 A | * | 6/1998 | Gross et al. .................. 700/29 |
| 5,777,896 A | * | 7/1998 | Arita et al. .................. 702/185 |
| 5,817,958 A | * | 10/1998 | Uchida et al. .............. 73/865.9 |
| 6,012,147 A | * | 1/2000 | Waedt et al. ................... 714/1 |
| 6,181,975 B1 | * | 1/2001 | Gross et al. .................. 700/29 |
| 6,292,523 B1 | * | 9/2001 | Senechal et al. ............ 376/259 |
| 6,484,126 B1 | * | 11/2002 | Brown et al. ................ 702/184 |
| 6,594,621 B1 | * | 7/2003 | Meeker ....................... 702/185 |
| 6,668,203 B1 | * | 12/2003 | Cook et al. ................... 700/65 |
| 6,735,549 B1 | * | 5/2004 | Ridolfo ....................... 702/181 |
| 6,795,798 B1 | * | 9/2004 | Eryurek et al. .............. 702/188 |
| 6,795,799 B1 | * | 9/2004 | Deb et al. ................... 702/188 |
| 6,839,597 B1 | * | 1/2005 | Hattori et al. ................. 700/27 |
| 6,853,920 B1 | * | 2/2005 | Hsiung et al. .................. 702/1 |
| 6,865,509 B1 | * | 3/2005 | Hsiung et al. .............. 702/182 |
| 6,892,107 B1 | * | 5/2005 | Baba et al. .................. 700/108 |
| 6,907,381 B1 | * | 6/2005 | Hayashi et al. ............. 702/181 |
| 2002/0052715 A1 | * | 5/2002 | Maki ........................... 702/184 |
| 2002/0161555 A1 | * | 10/2002 | Deb et al. .................... 702/188 |
| 2002/0161594 A1 | * | 10/2002 | Bryan et al. .................... 705/1 |
| 2002/0161940 A1 | * | 10/2002 | Eryurek et al. ............... 710/15 |
| 2003/0005486 A1 | * | 1/2003 | Ridolfo et al. .............. 800/288 |
| 2003/0023518 A1 | * | 1/2003 | Spriggs et al. ................ 705/28 |
| 2003/0167150 A1 | * | 9/2003 | Shimura et al. ............ 702/182 |
| 2003/0216888 A1 | * | 11/2003 | Ridolfo ....................... 702/181 |

(Continued)

FOREIGN PATENT DOCUMENTS

EP    1 288 810 A    3/2003

(Continued)

*Primary Examiner*—Patrick J. Assouad
(74) *Attorney, Agent, or Firm*—W. Warren Taltavull; Manelli Denison & Selter PLLC

(57) ABSTRACT

A remote monitoring system including a sub-system, local to a nuclear power plant and a remote sub-system at an operations base. Process data is collected manually by a hand-held computer and automatically by instrumentation on the power plant. The data collected is stored on a storage device before being transmitted via a communication link to a remote computer. The remote computer runs data analysis and diagnostic simulations on the process data from the power plant to predict future events.

6 Claims, 1 Drawing Sheet

U.S. PATENT DOCUMENTS

| | | | |
|---|---|---|---|
| 2004/0102924 A1* | 5/2004 | Jarrell et al. | 702/181 |
| 2004/0204908 A1* | 10/2004 | Hosaka et al. | 702/182 |
| 2004/0216114 A1* | 10/2004 | Lin | 718/105 |
| 2005/0033466 A1* | 2/2005 | Eryurek et al. | 700/108 |
| 2005/0131656 A1* | 6/2005 | Ikeda et al. | 702/188 |

FOREIGN PATENT DOCUMENTS

| | | |
|---|---|---|
| JP | 59042496 AB | 3/1984 |
| JP | 2002111705 AB | 4/2002 |

* cited by examiner

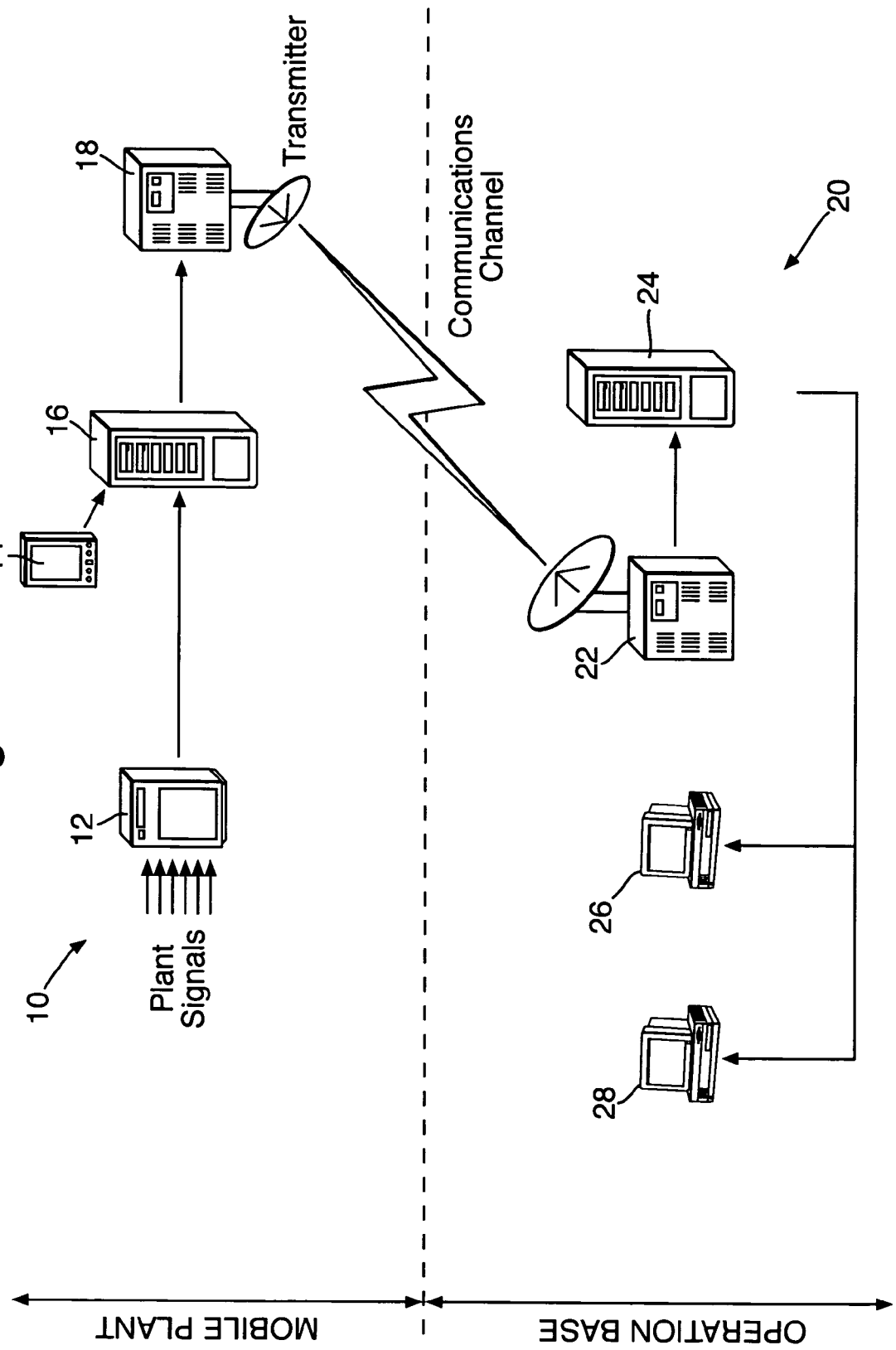

REMOTE MONITORING SYSTEM

FIELD OF THE INVENTION

The present invention relates to remote monitoring and more particularly to systems and methods for collecting and analysing process parameters from nuclear power plants.

BACKGROUND OF THE INVENTION

Current surveillance systems monitor an extensive range of process parameters from nuclear power plants. Many of these parameters are monitored automatically and the information is stored in an electronic storage system located near the nuclear power plant.

Mobile nuclear power plants are used for example in vessels such as submarines or surface ships. During normal operations the process parameters collected from the nuclear power plant are stored on a local computer. However in the event of any incident, which poses a potential threat to the safety of the power plant, the operators are required to monitor the power plant and log additional data manually. The operator then conveys this additional data to the relevant authorities, who co-ordinate the response to the incident and who are responsible for sharing current data with other authorities.

The quality, periodicity and supply of the data during an incident are dependent upon the operators. This relies on the operator being able to monitor the plant and communicate the information whilst working under abnormal conditions.

SUMMARY OF THE INVENTION

The present invention seeks to provide a monitoring system in which data is communicated automatically from the plant to a remote computer where it is subsequently processed.

According to the present invention a system for remotely monitoring a nuclear power plant comprises means for sensing process parameters relating to the nuclear power plant and generating a process data signal that is fed to a first storage device that stores said process data, the data stored on the first storage device being automatically transmitted via a communication link to a remote computer including a second storage device that stores the transmitted process data, the remote computer includes means for displaying and analysing the transmitted data.

In the preferred embodiment of the present invention the remote computer includes a diagnostic program that uses the process data stored in the second storage device to predict the behaviour of the nuclear power plant.

The diagnostic program may run in past, real or accelerated time to reproduce past behaviour, mirror current behaviour or predict future behaviour of the nuclear power plant.

Preferably a wireless communication link is used, such as radio, satellite or microwave, to transmit the process data however a telephone link may be used.

The nuclear power plant may be in a vessel such as a submarine or surface ship.

BRIEF DESCRIPTION OF THE INVENTION

The present invention will now be described with reference to FIG. 1, which is a schematic view of a remote monitoring system in accordance with the present invention.

DETAILED DESCRIPTION OF THE INVENTION

Referring to FIG. 1 a monitoring system in accordance with the present invention includes a sub-system 10, local to the nuclear power plant and a remote sub-system 20 at the operations base.

Process data is collected locally at the nuclear power plant. An extensive range of primary and secondary system parameters are monitored automatically from instrumentation 12 on the nuclear power plant. The various parameters are monitored and recorded into an electronic storage device 16 at a rate consistent with the resolution required for each individual parameter. The system will automatically and continually monitor the instrumentation and extract data for predefined plant parameters. No operator intervention is required for this mode of data acquisition.

Other parameters are required, which are either not instrumented or which cannot be easily instrumented. These parameters are monitored and recorded manually by an operator using a hand-held computer 14.

The hand-held computer 14 provides cost-effective means of logging these parameters and storing them in electronic format. The hand-held computer 14 normally sits in a cradle. Prior to logging, the hand-held computer 14 is downloaded with a procedure. Entries are made into a pre-defined screen layout, thereby ensuring consistent data entry. The hand-held computer 14 is then returned to its cradle and the logged data is transferred to the electronic storage device 16. This semi-automatic logging procedure imposes minimum workload on the operator.

Once acquired the data is compressed and stored on the electronic storage device 16. The stored data held in the electronic storage device 16 is automatically backed-up to a high capacity medium, such as a recordable DVD, on a regular basis.

Upon initiation, a wireless communication link sends the historical data and current data via a transmitter 18. The receiver 22 forwards the data files to a further electronic storage device 24 on an operations base remote from the nuclear power plant.

Data transfer will not take place until initiated by an operator, and will continue until the demand is revoked. Depending upon the required bandwidth, the data will either be transferred as a continuous stream or is transferred as discrete packages. Either way, once the data transfer is initiated, no further operator intervention is required.

Software facilities are provided within the equipment provided at the operations base. This software allows for analysis of the data that has been transferred to the storage device 24 on the operations base. The software will include tools that allow the display of the raw data 26 as well as trend analysis, data comparison and facilities to analyse the stored data. The data stored on the electronic storage device 24 will be protected by read-only access.

The plant data stored in the storage device 24 can be used to run diagnostic simulations 28 that predict likely outcomes.

The diagnostic simulation would be a "best-estimate" thermal-hydraulic model of the nuclear reactor plant. A "best-estimate" model mimics the plant as closely as possible and has the capability to be run in real-time or accelerated-time. The process data from the nuclear plant is used as initial conditions for the start of a simulation or to re-align a running simulation with the actual plant. Specialist knowledge of the nuclear power plant is embodied within the diagnostic simulation 28 to produce a faithful model of the nuclear reactor plant.

The diagnostic simulation would be used in the following ways;

(a) It could be used to re-run events. This would be done in slow or real time-scales, using actual plant data. This gives a specific understanding of events leading up to an incident and the consequences of the incident on the nuclear power plant.

(b) To forecast the future course of events, so that appropriate actions can be taken. The diagnostic simulation is initialised with actual plant data and then run in accelerated time to forecast future events.

(c) It can be used to try-out interventions prior to any action having been taken. The diagnostic simulation is run in accelerated time to understand the consequences of interventions.

(d) A simulation can be run in real-time to keep pace with the actual plant and confirm the theoretical state of the nuclear power plant. This would enable future outcomes to be predicted with confidence in the event of loss of communication with the plant.

A system in accordance with the present invention offers the advantage that the nuclear power plant is continuously and contiguously monitored from a remote location during normal and abnormal conditions. The diagnostic simulations enable interventions to be simulated and run in accelerated time to enable the development of an incident or accident to be remotely monitored through to a safe conclusion.

It will be appreciated that a remote monitoring system in accordance with the present invention is applicable to any nuclear power plant. The invention however has particular relevance to mobile nuclear power plants. The system acquires plant data, analyses it and can make predictions about future course of events. This significantly improves the ability to actively manage a nuclear power plant from a remote location.

We claim:

1. A system for remotely monitoring a nuclear power plant comprising means for sensing process parameters relating to the nuclear power plant and generating a process data signal that is fed to a first storage device that stores said process data, the data stored on said first storage device is automatically transmitted via a communication link to a remote computer including a second storage device that stores the transmitted process data, the remote computer including means for displaying and analyzing the transmitted process data and in which said remote computer includes a diagnostic program wherein said diagnostic program is run in accelerated time using data from said second storage device to predict future behavior of said nuclear power plant.

2. A system as claimed in claim 1 in which the means for sensing the process parameters is instrumentation on the power plant.

3. A system as claimed in claim 1 in which a wireless communication link transmits the data to the second storage device.

4. A system as claimed in claim 1 for the remote monitoring of a nuclear power plant is a vessel.

5. A system as claimed in claim 1 for the remote monitoring of a nuclear power plant in a submarine.

6. A system as claimed in claim 1 for the remote monitoring of a nuclear power plant in a surface ship.

* * * * *